United States Patent
Yu et al.

(10) Patent No.: US 8,084,959 B2
(45) Date of Patent: Dec. 27, 2011

(54) LIGHT EMITTING DIODE BACKLIGHT MODULE AND DRIVING APPARATUS AND METHOD THEREOF

(75) Inventors: Ching-Chou Yu, Taichung County (TW); Chien-Ming Ko, Taipei (TW); Yueh-Han Li, Taichung (TW); Hung-Ching Lee, Yilan County (TW)

(73) Assignee: Au Optronics Corporation, Hsinchu (TW)

( * ) Notice: Subject to any disclaimer, the term of this patent is extended or adjusted under 35 U.S.C. 154(b) by 368 days.

(21) Appl. No.: 12/356,546

(22) Filed: Jan. 21, 2009

(65) Prior Publication Data

US 2010/0134039 A1    Jun. 3, 2010

(30) Foreign Application Priority Data

Dec. 3, 2008 (TW) ................................. 97146996 A

(51) Int. Cl.
*G05F 1/00* (2006.01)
*H05B 37/02* (2006.01)
*H05B 39/04* (2006.01)
*H05B 41/36* (2006.01)

(52) U.S. Cl. ..................... 315/291; 315/185 R; 315/307; 315/308

(58) Field of Classification Search .................. None
See application file for complete search history.

(56) References Cited

U.S. PATENT DOCUMENTS

| 2006/0170373 | A1* | 8/2006 | Yang ......................... 315/209 R |
| 2007/0047256 | A1 | 3/2007 | Seong et al. |
| 2009/0040173 | A1* | 2/2009 | Ezaki et al. ................... 345/102 |
| 2009/0315473 | A1* | 12/2009 | Tsai et al. ...................... 315/291 |

FOREIGN PATENT DOCUMENTS

JP     7140438     6/1995

OTHER PUBLICATIONS

"1st Office Action of China counterpart application", issued on Feb. 12, 2010, p. 1-p. 7.

* cited by examiner

*Primary Examiner* — Anh Tran
(74) *Attorney, Agent, or Firm* — Jianq Chyun IP Office

(57) ABSTRACT

A light emitting diode (LED) backlight module, a driving apparatus and a driving method thereof are provided. The driving apparatus is adapted to drive at least one LED of at least one lighting unit within the LED backlight module. The driving apparatus includes a latch unit and a switch unit. The latch unit is used for receiving a control backlight data and latching the control backlight data during a frame period according to a trigger signal, so as to output a control signal. The switch unit is coupled to the latch unit and the LED for receiving the control signal to determine whether the LED emits or not.

20 Claims, 5 Drawing Sheets

LIGHT EMITTING DIODE BACKLIGHT MODULE AND DRIVING APPARATUS AND METHOD THEREOF

CROSS-REFERENCE TO RELATED APPLICATION

This application claims the priority benefit of Taiwan application serial no. 97146996, filed on Dec. 3, 2008. The entirety of the above-mentioned patent application is hereby incorporated by reference herein and made a part of specification.

BACKGROUND OF THE INVENTION

1. Field of the Invention

The present invention relates to a backlight module, more particularly, to a driving circuit and a method for a light emitting diode (LED) backlight module.

2. Description of the Related Art

In recent years, with great advance in the fabricating techniques of opto-electronics and semiconductor devices, flat panel displays (FPDs) have been vigorously developed. Among the FPDs, a liquid crystal display (hereinafter "LCD") has become the mainstream display product due to its advantages of outstanding space utilization efficiency, low power consumption, free radiation, and low electrical field interference.

In general, since an LCD panel does not emit light by itself. As such, it needs a backlight module disposed thereunder to provide plane light source required by the LCD panel. The conventional backlight modules could be classified two types. One of the two types is a backlight module composed by the cold cathode fluorescent lamps (CCFLs), and the other of the two types is a backlight module composed by the light emitting diodes (LEDs). Since the LED backlight module could promote the color gamut of the LCD, so that the current panel manufacturers mostly replace the CCFL backlight module with the LED backlight module.

However, since the LED backlight module nowadays is mostly driven by the pulse width modulation (PWM) and a concept of division controlling, so that when the number of areas/regions of division controlling are increased, it would be caused some following disadvantages:

1. The transmission lines and the transmission time would be substantially increased.

2. The control way of the PWM is not enough flexible.

3. Each area/region of division controlling would be disposed a current controller therein, so that the fabrication cost would be substantially increased.

SUMMARY OF THE INVENTION

The present invention is directed to a light emitting diode (LED) backlight module and a driving circuit and a driving method thereof, for reducing the transmission lines and the transmission time; increasing the flexible of the control way of the PWM; and adopting the fixed-voltage control to reduce the fabrication cost.

The present invention provides a driving circuit suitable for driving at least a light emitting diode (LED) of at least a lighting unit within an LED backlight module of a liquid crystal display (LCD). The driving circuit includes a latch unit and a switch unit. The latch unit is used for receiving a control backlight data, and latching the control backlight data according to a trigger signal during a frame period, so as to output a control signal. The switch unit is coupled to the latch unit and the LED, for receiving the control signal to determine whether the LED emits or not.

The present invention also provides a driving method suitable for driving at least an LED of at least a lighting unit within an LED backlight module of an LCD. The method includes the following steps of providing a control backlight data and a trigger; latching the control backlight data according to the trigger signal during a frame period, so as to output a control signal; and driving the LED according to the control signal.

The present invention also provides an LED backlight module having the driving circuit of the present invention.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figure 1:
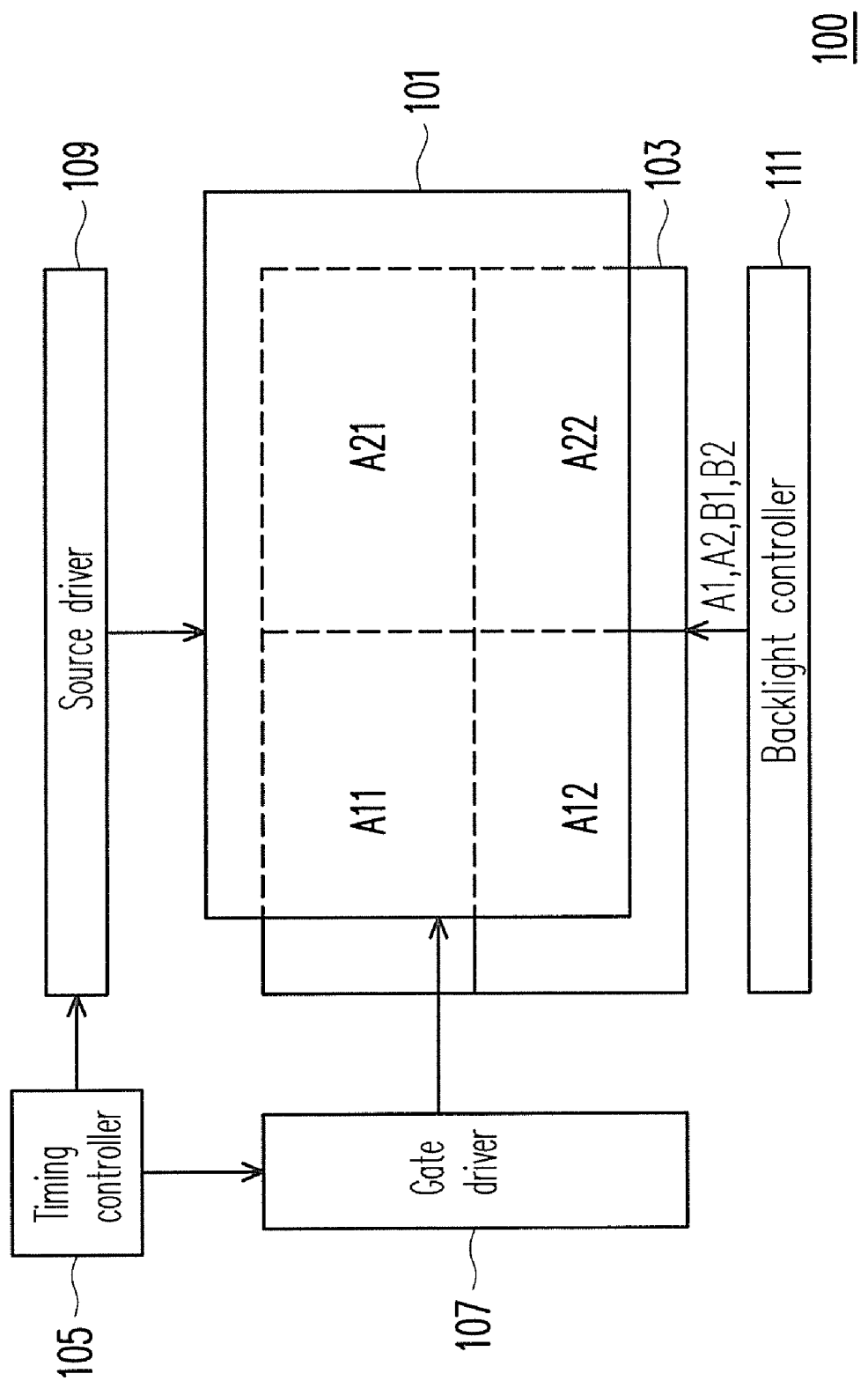
FIG. 1 is a block diagram of a liquid crystal display (LCD) according to an exemplary embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a block diagram of a liquid crystal display (LCD) 100 according to an exemplary embodiment of the present invention. Referring to FIG. 1, the LCD 100 includes an LCD panel 101, an LED backlight module 103, a timing controller 105, a gate driver 107, a source driver 109 and a backlight controller 111. The gate driver 107 and the source driver 109 are controlled by the timing controller 105 for respectively providing the scan signals and the display signals to drive the pixels within the LCD panel 101.

In the exemplary embodiment, the LED backlight module 103 has four area/region lighting units A11, A12, A21 and A22 (but not limited thereto), each of the lighting units A11, A12, A21 and A22 is controlled by the backlight controller 111 for respectively providing light source to the corresponding pixel areas/regions of the LCD panel 101.

Figure 2:
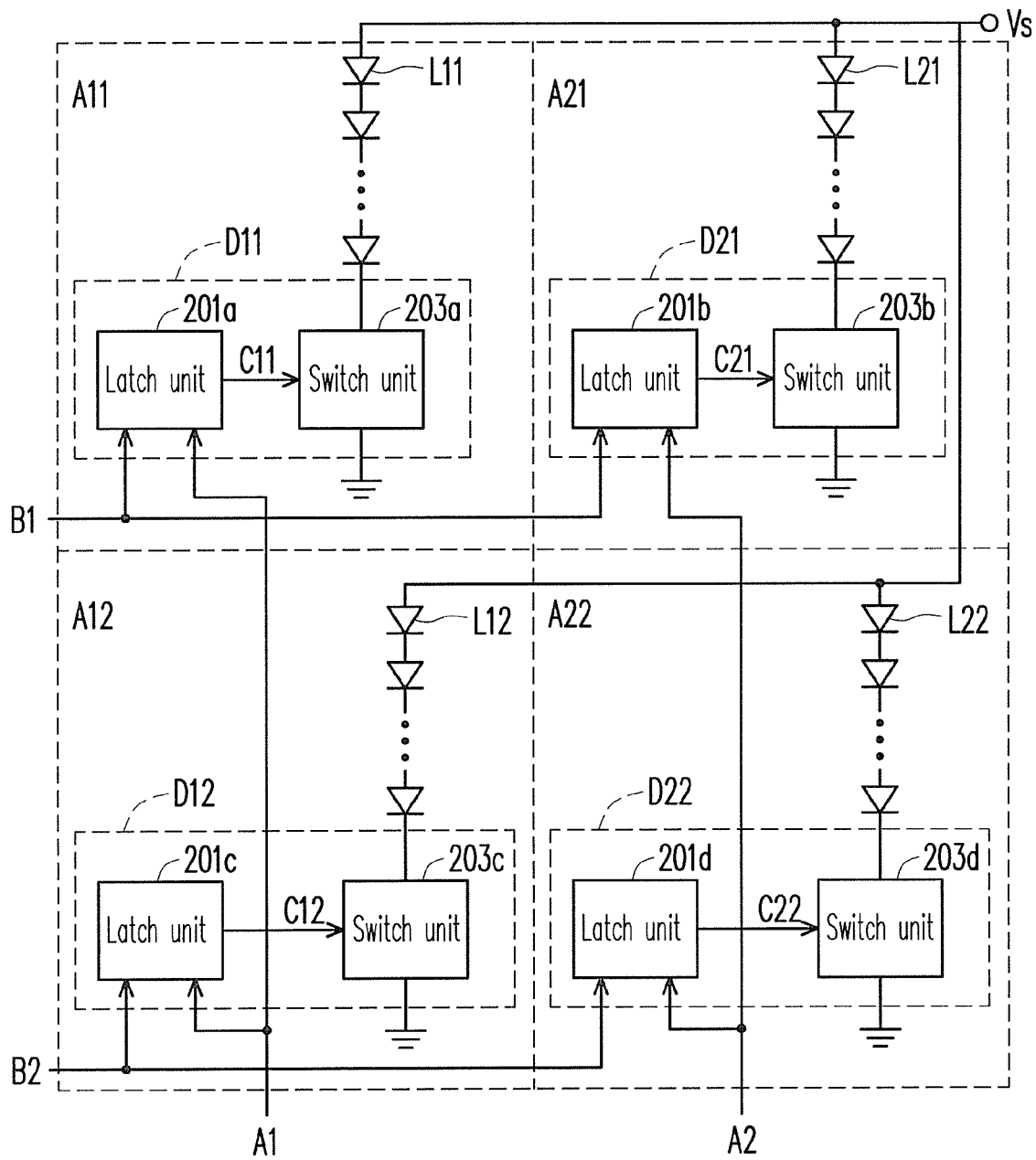
FIG. 2 is a circuit diagram of a light emitting diode (LED) backlight module according to an exemplary embodiment of the present invention.

To be specific, FIG. 2 is a circuit diagram of the LED backlight module 103 according to an exemplary embodiment of the present invention. Referring to FIG. 1 and FIG. 2, each of the lighting units A11, A12, A21 and A22 includes a plurality of LEDs connected in series and a driving circuit, namely, the lighting unit A11 includes the plurality of LEDs L11 connected in series (hereinafter "the LED string L11") and the driving circuit D11; the lighting unit A12 includes the plurality of LEDs L12 connected in series (hereinafter "the LED string L12") and the driving circuit D12; the lighting unit A21 includes the plurality of LEDs L21 connected in series (hereinafter "the LED string L21") and the driving circuit D21; and the lighting unit A22 includes the plurality of LEDs L22 connected in series (hereinafter "the LED string L22") and the driving circuit D22.

In the exemplary embodiment, the driving circuit D11 of the lighting unit A11 includes a latch unit 201a and the switch unit 203a. The latch unit 201a is used for receiving the control backlight data A1 provided by the backlight controller 111, and latching the control backlight data A1 according to the trigger signal B1 provided by the backlight controller 111 during a frame period of the LCD 100, so as to output the control signal C11. The switch unit 203a is coupled to the latch unit 201a and the LED string L11, for receiving the control signal C11 outputted from the latch unit 201a to determine whether the LED string L11 emits or not.

The driving circuit D21 of the lighting unit A21 includes a latch unit 201b and the switch unit 203b. The latch unit 201b is used for receiving the control backlight data A2 provided by the backlight controller 111, and latching the control backlight data A2 according to the trigger signal B1 provided by the backlight controller 111 during a frame period of the LCD 100, so as to output the control signal C21. The switch unit 203b is coupled to the latch unit 201b and the LED string L21, for receiving the control signal C21 outputted from the latch unit 201b to determine whether the LED string L21 emits or not.

The driving circuit D12 of the lighting unit A12 includes a latch unit 201c and the switch unit 203c. The latch unit 201c is used for receiving the control backlight data A1 provided by the backlight controller 111, and latching the control backlight data A1 according to the trigger signal B2 provided by the backlight controller 111 during a frame period of the LCD 100, so as to output the control signal C12. The switch unit 203c is coupled to the latch unit 201c and the LED string L12, for receiving the control signal C12 outputted from the latch unit 201c to determine whether the LED string L12 emits or not.

The driving circuit D22 of the lighting unit A22 includes a latch unit 201d and the switch unit 203d. The latch unit 201d is used for receiving the control backlight data A2 provided by the backlight controller 111, and latching the control backlight data A2 according to the trigger signal B2 provided by the backlight controller 111 during a frame period of the LCD 100, so as to output the control signal C22. The switch unit 203d is coupled to the latch unit 201d and the LED string L22, for receiving the control signal C22 outputted from the latch unit 201d to determine whether the LED string L22 emits or not.

Figure 3:
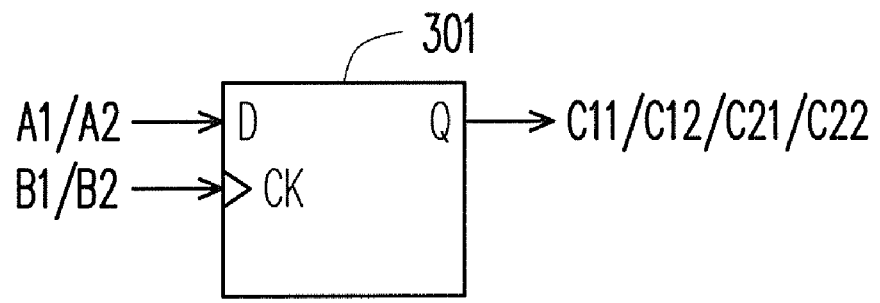
FIG. 3 is a circuit diagram of each of the latch units according to an exemplary embodiment of the present invention.
Figure 4:
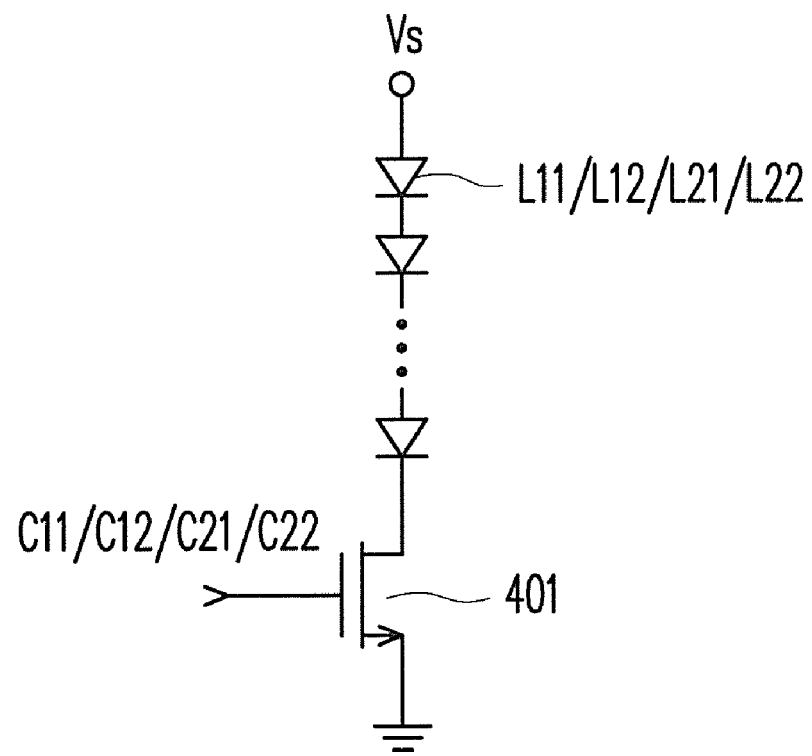
FIG. 4 is a circuit diagram of each of the switch units according to an exemplary embodiment of the present invention.

To be specific, FIG. 3 is a circuit diagram of each of the latch units 201a~201d according to an exemplary embodiment of the present invention. FIG. 4 is a circuit diagram of each of the switch units 203a~203d according to an exemplary embodiment of the present invention. Referring to FIG. 1 through FIG. 4, each of the latch units 201a~201d is composed of a D flip-flop 301 including a data receiving terminal D correspondingly receiving the control backlight data A1 or A2 provided by the backlight controller 111, a clock receiving terminal CK correspondingly receiving the trigger signals B1 or B2 provided by the backlight controller 111, and a data output terminal Q correspondingly outputting the control signals C11, C12, C21 or C22. Herein, it can be understood that the control signals C11, C12, C21 and C22 are PWM signals for correspondingly/respectively driving the LED strings L11, L12, L21 and L22.

In addition, as shown in FIG. 4, each of the switch units is composed of an N-type transistor including a gate correspondingly receiving the control signals C11, C12, C21 or C22 outputted from the latch units 201a~201d, a first drain/source coupled to a system voltage Vs through the corresponding LED strings L11, L12, L21 or L22, and a second drain/source coupled to a ground potential.

Figure 5:
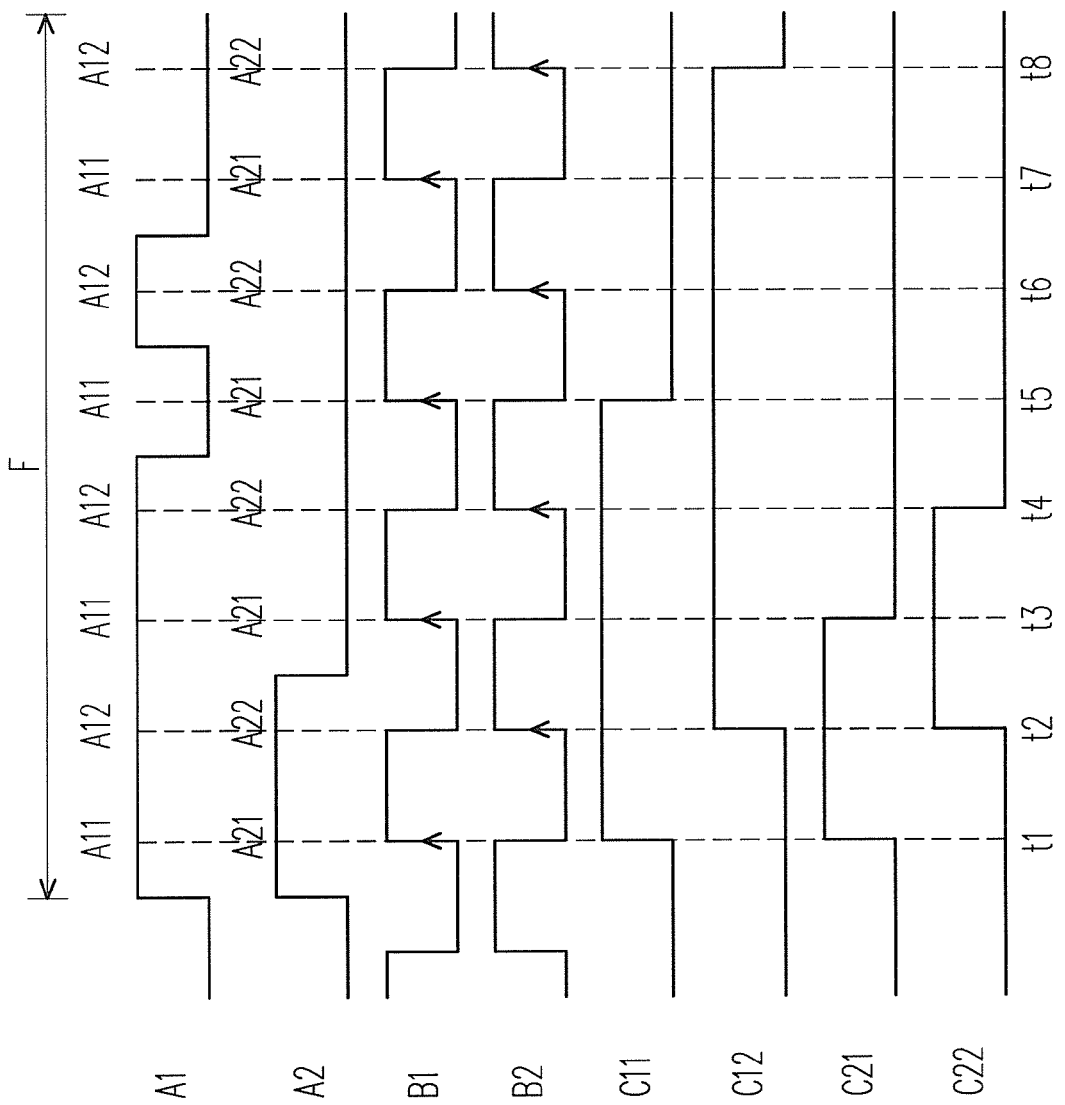
FIG. 5 is an operation timing chart of each of the driving circuit according to an exemplary embodiment of the present invention.
Figure 6:
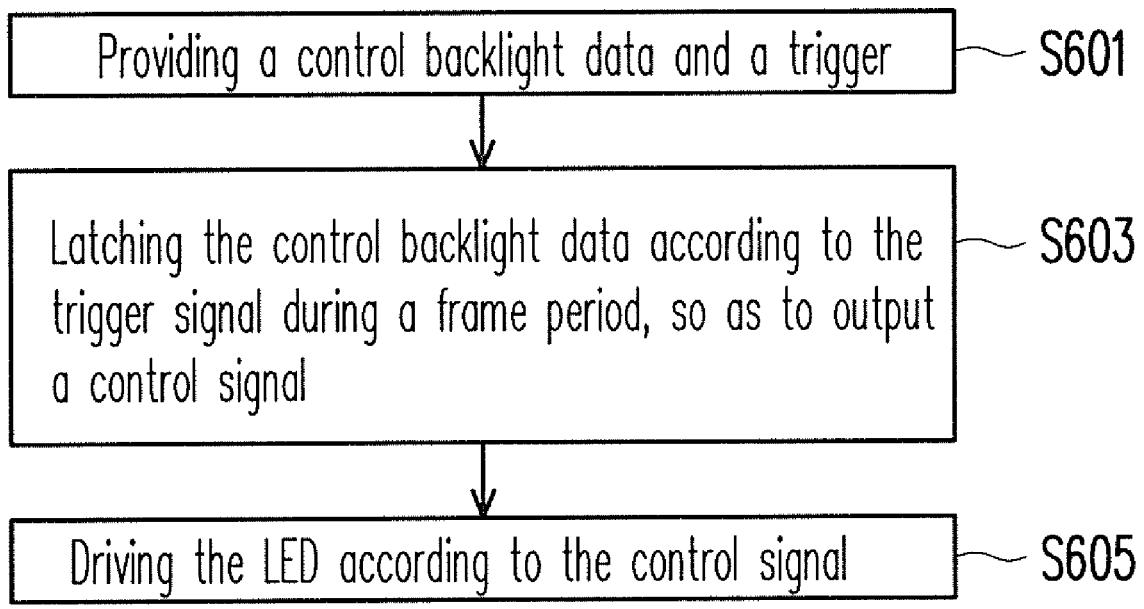
FIG. 6 is a flow chart of a driving method according to an exemplary embodiment of the present invention.

FIG. 5 is an operation timing chart of each of the driving circuit according to an exemplary embodiment of the present invention. FIG. 6 is a flow chart of a driving method according to an exemplary embodiment of the present invention. Referring to FIG. 1 through FIG. 6, in the exemplary embodiment, suppose the resolution of each of the control signals C11, C12, C21 and C22 (i.e. PWM signal) is 4-bit during a frame period F of the LCD 100; the duty cycle of the control signal C11 is 50%; the duty cycle of the control signal C12 is 75%; the duty cycle of the control signal C21 is 25%; and the duty cycle of the control signal C22 is 25%.

Accordingly, since the resolution of each of the control signals C11, C12, C21 and C22 is 4-bit, so that the driving circuits D11, D12, D21 and D22 within each of the lighting units A11, A12, A21 and A22 should receive four control backlight data A1 or A2 during a frame period F of the LCD 100, namely, each of the latch units 201a~201d latches four times to the control backlight data A1 or A2 according to the trigger signals B1 or B2 during a frame period F.

In addition, the duty cycle of each of the control signals C11, C12, C21 and C22 (i.e. the duty cycle of the PWM signal) is determined by each of the latch units 201a~201d latching-off the control backlight data A1 or A2 according to the trigger signals B1 or B2 during a frame period F, such that to determine the illumination of each of the LED strings L11, L12, L21 and L22.

Explaining to the lighting unit A11 firstly, the data receiving terminal D and the clock receiving terminal CK of the D flip-flop 301 of the latch unit 201a would respectively receive the control backlight data A1 and the trigger signal B1 provided by the backlight controller 111 (in step S601), accordingly, at the time t1, the D flip-flop 301 of the latch unit 201a would be triggered by the rising edge of the trigger signal B1, such that the D flip-flop 301 of the latch unit 201a would latch the $1^{st}$ control backlight data A1 under the high voltage level (in step S603), and output the control signal C11 to drive the LED string L11 (in step S605).

Next, at the time t3, the D flip-flop 301 of the latch unit 201a would be triggered again by the rising edge of the trigger signal B1, such that the D flip-flop 301 of the latch unit 201a would latch the $2^{nd}$ control backlight data A1 under the high voltage level, and output the control signal C11 to drive the LED string L11. Thereafter, at the time t5, the D flip-flop 301 of the latch unit 201a would be triggered again by the rising edge of the trigger signal B1, such that the D flip-flop 301 of the latch unit 201a would latch the $3^{rd}$ control backlight data A1 under the low voltage level, and output the control signal C11 to drive the LED string L11. Finally, at the time t7, the D flip-flop 301 of the latch unit 201a would be triggered again by the rising edge of the trigger signal B1, such that the D flip-flop 301 of the latch unit 201a would latch the $4^{th}$ control backlight data A1 under the low voltage level, and output the control signal C11 to drive the LED string L11.

Accordingly, the driving circuits D11 within the lighting unit A11 would correspondingly receive four control backlight data A1 during a frame period F of the LCD 100, such that the D flip-flop 301 of the latch unit 201a would output the control signal C11 with 50% duty cycle for controlling the N-type transistor 401 of the switch unit 203a to be conducted, and thereupon, the LED string L11 would emit to provide the light source to the corresponding pixel areas/regions of the LCD panel 101.

Explaining to the lighting unit A21 next, the data receiving terminal D and the clock receiving terminal CK of the D flip-flop 301 of the latch unit 201b would respectively receive the control backlight data A2 and the trigger signal B1 provided by the backlight controller 111 (in step S601), accordingly, at the time t1, the D flip-flop 301 of the latch unit 201b would be triggered by the rising edge of the trigger signal B1, such that the D flip-flop 301 of the latch unit 201b would latch the $1^{st}$ control backlight data A2 under the high voltage level (in step S603), and output the control signal C21 to drive the LED string L21 (in step S605).

Next, at the time t3, the D flip-flop 301 of the latch unit 201b would be triggered again by the rising edge of the trigger signal B1, such that the D flip-flop 301 of the latch unit 201b would latch the $2^{nd}$ control backlight data A2 under the low voltage level, and output the control signal C21 to drive the LED string L21. Thereafter, at the time t5, the D flip-flop 301 of the latch unit 201b would be triggered again by the rising edge of the trigger signal B1, such that the D flip-flop 301 of the latch unit 201b would latch the $3^{rd}$ control backlight data A2 under the low voltage level, and output the control signal C21 to drive the LED string L21. Finally, at the time t7, the D flip-flop 301 of the latch unit 201b would be triggered again by the rising edge of the trigger signal B1, such that the D flip-flop 301 of the latch unit 201b would latch the $4^{th}$ control backlight data A2 under the low voltage level, and output the control signal C21 to drive the LED string L21.

Accordingly, the driving circuits D21 within the lighting unit A21 would correspondingly receive four control backlight data A2 during a frame period F of the LCD 100, such that the D flip-flop 301 of the latch unit 201b would output the control signal C21 with 25% duty cycle for controlling the N-type transistor 401 of the switch unit 203b to be conducted, and thereupon, the LED string L21 would emit to provide the light source to the corresponding pixel areas/regions of the LCD panel 101.

Explaining to the lighting unit A12 next, the data receiving terminal D and the clock receiving terminal CK of the D flip-flop 301 of the latch unit 201c would respectively receive the control backlight data A1 and the trigger signal B2 provided by the backlight controller 111 (in step S601), accordingly, at the time t2, the D flip-flop 301 of the latch unit 201c would be triggered by the rising edge of the trigger signal B2, such that the D flip-flop 301 of the latch unit 201c would latch the $1^{st}$ control backlight data A1 under the high voltage level (in step S603), and output the control signal C12 to drive the LED string L12 (in step S605).

Next, at the time t4, the D flip-flop 301 of the latch unit 201c would be triggered again by the rising edge of the trigger signal B2, such that the D flip-flop 301 of the latch unit 201c would latch the $2^{nd}$ control backlight data A1 under the high voltage level, and output the control signal C12 to drive the LED string L12. Thereafter, at the time t6, the D flip-flop 301 of the latch unit 201c would be triggered again by the rising edge of the trigger signal B2, such that the D flip-flop 301 of the latch unit 201c would latch the $3^{rd}$ control backlight data A1 under the high voltage level, and output the control signal C12 to drive the LED string L12. Finally, at the time t8, the D flip-flop 301 of the latch unit 201c would be triggered again by the rising edge of the trigger signal B2, such that the D flip-flop 301 of the latch unit 201c would latch the $4^{th}$ control backlight data A1 under the low voltage level, and output the control signal C12 to drive the LED string L12.

Accordingly, the driving circuits D12 within the lighting unit A12 would correspondingly receive four control backlight data A1 during a frame period F of the LCD 100, such that the D flip-flop 301 of the latch unit 201c would output the control signal C12 with 75% duty cycle for controlling the N-type transistor 401 of the switch unit 203c to be conducted, and thereupon, the LED string L12 would emit to provide the light source to the corresponding pixel areas/regions of the LCD panel 101.

Explaining to the lighting unit A22 finally, the data receiving terminal D and the clock receiving terminal CK of the D flip-flop 301 of the latch unit 201d would respectively receive the control backlight data A2 and the trigger signal B2 provided by the backlight controller 111 (in step S601), accordingly, at the time t2, the D flip-flop 301 of the latch unit 201d would be triggered by the rising edge of the trigger signal B2, such that the D flip-flop 301 of the latch unit 201d would latch the $1^{st}$ control backlight data A2 under the high voltage level (in step S603), and output the control signal C22 to drive the LED string L22 (in step S605).

Next, at the time t4, the D flip-flop 301 of the latch unit 201d would be triggered again by the rising edge of the trigger signal B2, such that the D flip-flop 301 of the latch unit 201d would latch the $2^{nd}$ control backlight data A2 under the low voltage level, and output the control signal C22 to drive the LED string L22. Thereafter, at the time t6, the D flip-flop 301 of the latch unit 201d would be triggered again by the rising edge of the trigger signal B2, such that the D flip-flop 301 of the latch unit 201d would latch the $3^{rd}$ control backlight data A2 under the low voltage level, and output the control signal C22 to drive the LED string L22. Finally, at the time t8, the D flip-flop 301 of the latch unit 201d would be triggered again by the rising edge of the trigger signal B2, such that the D flip-flop 301 of the latch unit 201d would latch the $4^{th}$ control backlight data A2 under the low voltage level, and output the control signal C22 to drive the LED string L22.

Accordingly, the driving circuits D22 within the lighting unit A22 would correspondingly receive four control backlight data A2 during a frame period F of the LCD 100, such that the D flip-flop 301 of the latch unit 201d would output the control signal C22 with 25% duty cycle for controlling the N-type transistor 401 of the switch unit 203d to be conducted, and thereupon, the LED string L22 would emit to provide the light source to the corresponding pixel areas/regions of the LCD panel 101.

In the exemplary embodiment, the driving circuits with the same column would receive the same control backlight data, namely, the driving circuits D11 and D12 would receive the same control backlight data A1, and the driving circuits D21 and D22 would receive the same control backlight data A2. Besides, the driving circuits with the same row would receive the same trigger signal, namely, the driving circuits D11 and D21 would receive the same trigger signal B1, and the driving circuits D12 and D22 would receive the same trigger signal B2. Accordingly, the transmission lines for receiving the trigger signals B1 or B2 can control all of the LED strings of the lighting units with the same row, such that the exemplary embodiment comparing with the conventional would substantially reduce the transmission lines and the transmission time.

In addition, a number resolution bits of each of the control signals C11, C12, C21 and C22 (i.e. PWM signals) could be changed by the particularly design requirements in the exemplary embodiment, and the control backlight data A1 and A2 provided by the backlight controller 111 also could be adaptively changed to increase the flexible of the control way of the PWM. Furthermore, the exemplary embodiment is adopted the fixed-voltage control, such that it does not use the current controller in each area/region of division controlling so as to substantially reduce the fabrication cost.

However, in other exemplary embodiments of the present invention, the number of times for latching by each of the latch units 201*a*~201*d* according to the trigger signals B1 or B2 during a frame period F is also determined by the control backlight data A1 or A2. To be specific, the controller 111 would firstly analyze/determine the change level of the control backlight data A1 or A2 to adaptively determine whether or not the trigger signals B1 or B2 is provided to the driving circuits D11, D12, D21 and D22.

For example, since the latch unit 201*c* of the driving circuit D12 would latch and output the control backlight data A1 under the high voltage level at the times t2, t4 and t6. Therefore, before the trigger signal B2 is provided to the latch unit 201*c* of the driving circuit D12, the backlight controller 111 would firstly analyze/determine that the control backlight data A1 is not changed, such that the trigger signal B2 would not be provided to the latch unit 201*c* of the driving circuit D12 at the times t4 and t6, so as to reduce the power consumption.

Even though, the exemplary embodiment explains that the resolution is 4-bit under four lighting units A11, A12, A21 and A22 collocating with the control signals C11, C12, C21 and C22 during a frame period of the LCD 100; the duty cycle of the control signal C11 is 50%; the duty cycle of the control signal C12 is 75%; the duty cycle of the control signal C21 is 25%; and the duty cycle of the control signal C22 is 25%, but one person having skilled in the art should easily deduce/analogize from/to other embodiments under more lighting units collocating with other setting conditions by explaining of the above exemplary embodiments, so that it would not be described in detail herein.

In addition, the control backlight data A1 and A2 and the trigger signals B1 and B2 are all provided to the driving circuits D11, D12, D21 and D22 by the backlight controller 111 in the above exemplary embodiment. However, in other exemplary embodiments of the present invention, the control backlight data A1 and A2 and the trigger signals B1 and B2 also could be provided to the driving circuits D11, D12, D21 and D22 by the timing controller 105, but all are not limited thereto.

In summary, the present driving circuits, for driving the LED backlight module, are arranged by a matrix in each area/region of each of the areas/regions of division controlling, and the trigger signals are provided by fast scanning to control each LED string of each lighting unit, such that the transmission lines and the transmission time can be substantially reduced under this design way. In addition, since each driving circuit has a latch unit to latch the control backlight module, so that the illumination of the LED string of each lighting unit could not be reduced or flickered under the trigger signals are provided to the LED string of each lighting unit by fast scanning.

Furthermore, since each driving circuit adopts the fixed-voltage control to drive the LED string of each lighting unit, such that it does not use the current controller in each area/region of division controlling so as to substantially reduce the fabrication cost. Moreover, a number resolution bits of each control signal outputted from the latch unit in each driving circuit could be changed by the particularly design requirements, and the control backlight data provided by the backlight controller or the timing controller also could be adaptively changed to substantially increase the flexible of the control way of the PWM.

It will be apparent to those skills in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A driving circuit, suitable for driving at least a light emitting diode (LED) of at least a lighting unit within an LED backlight module of a liquid crystal display (LCD), the driving circuit comprising:
a latch unit, for receiving a control backlight data, and latching the control backlight data according to a trigger signal during a frame period, so as to output a control signal; and
a switch unit, coupled to the latch unit and the LED, for receiving the control signal to determine whether the LED emits or not.

2. The driving circuit according to claim 1, wherein the latch unit comprises:
a D flip-flop, having a data receiving terminal receiving the control backlight data, a clock receiving terminal receiving the trigger signal, and a data output terminal outputting the control signal.

3. The driving circuit according to claim 1, wherein the switch unit comprises:
an N-type transistor, having a gate receiving the control signal, a first drain/source coupled to a system voltage through the LED, and a second drain/source coupled to a ground potential.

4. The driving circuit according to claim 3, wherein when the N-type transistor is conducted, the LED emits, whereas the LED does not emit.

5. The driving circuit according to claim 1, wherein the LCD further comprises a timing controller; and the LED backlight module further comprises a backlight controller, wherein one of the timing control and the backlight controller is coupled to the driving circuit for providing the control backlight data and the trigger signal.

6. The driving circuit according to claim 1, wherein the control signal is a pulse width modulation (PWM) signal.

7. A light emitting diode (LED) backlight module, suitable for a liquid crystal display (LCD), the LED backlight module comprising:
at least a lighting unit, comprising at least an LED; and
at least a driving circuit, for driving the LED, and the driving circuit comprising:
a latch unit, for receiving a control backlight data, and latching the control backlight data according to a trigger signal during a frame period, so as to output a control signal; and
a switch unit, coupled to the latch unit and the LED, for receiving the control signal to determine whether the LED emits or not.

8. The LED backlight module according to claim 7, wherein the latch unit comprises:
a D flip-flop, having a data receiving terminal receiving the control backlight data, a clock receiving terminal receiving the trigger signal, and a data output terminal outputting the control signal.

9. The LED backlight module according to claim 7, wherein the switch unit comprises:

an N-type transistor, having a gate receiving the control signal, a first drain/source coupled to a system voltage through the LED, and a second drain/source coupled to a ground potential.

10. The LED backlight module according to claim 9, wherein when the N-type transistor is conducted, the LED emits, whereas the LED does not emit.

11. The LED backlight module according to claim 7, further comprising:
a backlight controller, coupled to the driving circuit, for providing the control backlight data and the trigger signal.

12. The LED backlight module according to claim 7, wherein the LCD comprises a timing controller, coupled to the driving circuit, for providing the control backlight data and the trigger signal.

13. The LED backlight module according to claim 7, wherein the control signal is a pulse width modulation (PWM) signal.

14. A driving method, suitable for driving at least a light emitting diode (LED) of at least a lighting unit within an LED backlight module of a liquid crystal display (LCD), the driving method comprising:
providing a control backlight data and a trigger;
latching the control backlight data according to the trigger signal during a frame period, so as to output a control signal; and
driving the LED according to the control signal.

15. The driving method according to claim 14, wherein a number of times for latching the control backlight data according to the trigger signal during the frame period are determined by a number resolution bits or the control backlight data.

16. The driving method according to claim 14, wherein a duty cycle of the control signal is determined by latching-off the control backlight data according to the trigger signal during the frame period.

17. The driving method according to claim 16, wherein the duty cycle of the control signal determines the illumination of the LED.

18. The driving method according to claim 14, wherein the control signal is a pulse width modulation (PWM) signal.

19. A light emitting diode (LED) backlight module, suitable for a liquid crystal display (LCD), the LED backlight module comprising:
a first lighting unit, comprising at least a first LED;
a second light unit, comprising at least a second LED;
a first driving circuit, for driving the first LED, and the first driving circuit comprising:
a first latch unit, for receiving a first control backlight data, and latching the first control backlight data according to a first trigger signal during a frame period, so as to output a first control signal; and
a first switch unit, coupled to the first latch unit and the first LED, for receiving the first control signal to determine whether the first LED emits or not; and
a second driving circuit, for driving the second LED, and the second driving circuit comprising:
a second latch unit, for receiving a second control backlight data, and latching the second control backlight data according to the first trigger signal during the frame period, so as to output a second control signal; and
a second switch unit, coupled to the second latch unit and the second LED, for receiving the second control signal to determine whether the second LED emits or not.

20. The LED backlight module according to claim 19, further comprising:
a third lighting unit, comprising at least a third LED;
a fourth lighting unit, comprising at least a fourth LED;
a third driving circuit, for driving the third LED, and the third driving circuit comprising:
a third latch unit, for receiving the first control backlight data, and latching the first control backlight data according to a second trigger signal during the frame period, so as to output a third control signal; and
a third switch unit, coupled to the third latch unit and the third LED, for receiving the third control signal to determine whether the third LED emits or not; and
a fourth driving circuit, for driving the fourth LED, and the fourth driving circuit comprising:
a fourth latch unit, for receiving the second control backlight data, and latching the second control backlight data according to the second trigger signal during the frame period, so as to output a fourth control signal; and
a fourth switch unit, coupled to the fourth latch unit and the fourth LED, for receiving the fourth control signal to determine whether the fourth LED emits or not.

* * * * *